United States Patent
Arrigo et al.

[15] 3,678,108
[45] July 18, 1972

[54] HYDROGENATION OF NITROBENZENE

[72] Inventors: Joseph T. Arrigo, Westbury, N.Y.; Nils J. Christensen, Palatine, Ill.

[73] Assignee: Universal Oil Products Company, Des Plaines, Ill.

[22] Filed: May 13, 1970

[21] Appl. No.: 37,022

[52] U.S. Cl. .................260/563 D, 252/466 R, 252/473, 252/474, 260/580
[51] Int. Cl. .................................................C07c 85/10
[58] Field of Search .................................260/563 D

[56] References Cited

UNITED STATES PATENTS 3,194,839  7/1965  Robinson et al. ..............260/575

Primary Examiner—Joseph Rebold
Assistant Examiner—D. R. Phillips
Attorney—James R. Hoatson, Jr. and Bernard L. Kramer

[57] ABSTRACT

Hydrogenating nitrobenzene to cyclohexylamine using a rhodium catalyst and minimizing the formation of dicyclohexylamine by effecting said hydrogenation in a secondary or tertiary alcohol solvent.

10 Claims, No Drawings

HYDROGENATION OF NITROBENZENE

BACKGROUND OF THE INVENTION

The manufacture of cyclohexylamine has been the subject of extensive research, particularly for use in the manufacture of cyclamates as artificial sweeteners. Most of the research has been directed to the hydrogenation of aniline to cyclohexylamine utilizing numerous hydrogenation catalysts and particularly nickel, cobalt, iron, copper, platinum, palladium, etc., as well as ruthenium and rhodium. While some of these catalysts have been utilized in attempts to develop a satisfactory process for the hydrogenation of nitrobenzene to cyclohexylamine, further complications have been encountered.

It is believed that the additional difficulties encountered when utilizing nitrobenzene as the charge can be attributed, at least in part, to differences in the rates of hydrogenation of the nitro group versus the rate of hydrogenation of the benzene nucleus, and these reactions versus the further reaction to unwanted dicyclohexylamine and other high boiling products.

DESCRIPTION OF THE INVENTION

The present invention is directed to a novel method of hydrogenating nitrobenzene to cyclohexylamine and minimizing the formation of unwanted dicyclohexylamine and other high boiling products. The formation of less valuable dicyclohexylamine, for example, is objectionable because it consumes nitrobenzene charge in forming the dicyclohexylamine and thus reduces the yield of cyclohexylamine, as well as necessitating additional processing steps to separate the cyclohexylamine product from the dicyclohexylamine.

In our investigation of various catalysts for use in this hydrogenation system, it was concluded that rhodium catalyst possesses advantages. However, the use of the rhodium catalyst presents problems which are peculiar to this catalyst. The present invention provides a novel process in which certain critical requirements must be observed. As hereinbefore set forth, one of these requirements is the use of a secondary or tertiary alcohol solvent. Another requirement is that the amount of catalyst must be sufficient to effect substantially complete conversion of the nitrobenzene charge and, on the other hand, the amount of catalyst must not be too great to catalyze excessive reaction of the nitro group. These and other requirements will be discussed in detail hereinafter.

In one embodiment, the present invention relates to the hydrogenation of nitrobenzene to cyclohexylamine in contact with a rhodium catalyst and minimizing the formation of dicyclohexylamine, which comprises effecting said hydrogenation in a secondary or tertiary alcohol solvent at a temperature of at least 50° C., a hydrogenation pressure of at least 100 psi and in contact with at least 0.001 percent by weight of catalyst, computed as the metal, based on the nitrobenzene charge.

As hereinbefore set forth, while the rhodium catalyst offers advantages for use in this process, the use of the catalyst presents peculiar complications. It appears that the high activity of the rhodium catalyst toward the nitro group results in a fast initial exothermic reaction which, in turn, can result in the reaction getting out of control. It has been found that the use of a secondary or tertiary alcohol solvent serves, at least in part, to temper the high activity of the rhodium catalyst toward the nitro group. While applicants do not wish to be limited to the following explanation, it is believed that the excessive reaction of the nitro group may be due to the acidity of the system. The secondary or tertiary alcohol solvent is of much lower Bronsted acidity than a primary alcohol solvent and thus will assist in minimizing the excessive reaction of the nitro group. Any suitable secondary or tertiary alcohol may be used as solvent. The alcohol may contain from three to about 20 and preferably from three to six carbon atoms. Preferred solvents include isopropyl alcohol and tertiary butyl alcohol. Other secondary and tertiary alcohols include secondary amyl alcohol, secondary hexyl alcohol, tertiary amyl alcohol, tertiary hexyl alcohol, etc.

The excessive reaction of the nitro group also is controlled by utilizing the nitrobenzene as a solution of less than 50 percent in the alcohol solvent and preferably of less than 25 percent by volume. Preferred solutions contain from about 2 percent to about 25 percent and more particularly from about 4 percent to about 20 percent by volume of nitrobenzene.

Any suitable rhodium catalyst may be employed and preferably is a supported catalyst in which the rhodium comprises from about 0.1 percent to about 20 percent and more preferably from about 1 percent to about 10 percent by weight of the composite. Any suitable support is used and preferably comprises alumina. Other supports comprise carbon, kieselguhr, silica, etc. The rhodium may be present as the free metal or as a compound or complex. The catalyst is prepared in any suitable conventional manner. In one method this may comprise first preparing alumina, which preferably is of high purity, and then commingling therewith a salt of rhodium, such as rhodium chloride, rhodium nitrate, rhodium sulfate, etc. and forming the composite by heating in the presence or absence of oxygen, hydrogen, nitrogen or other gas. The catalyst may be formed into particles of uniform or irregular size and shape. In a particularly preferred embodiment the catalyst is prepared as finely divided particles, which may range from powder to about one-eighth inch in size.

As hereinbefore set forth, the excessive reaction of the nitro group may be due to the acidity. Accordingly, in another embodiment of the invention, an alkali or alkaline earth metal component is incorporated in the catalyst composition. A particularly preferred alkaline component is lithium. Other alkaline components comprise sodium, potassium, rubidium, cesium, beryllium, magnesium, calcium, strontium and barium. The alkaline component may be incorporated in the catalyst composite in any suitable manner. For example, lithium nitrate may be commingled with the alumina, rhodium or the alumina-rhodium composite prior to final heating. The alkaline component may be present in the final composite as the metal or as a compound thereof and preferably the oxide. The alkaline component may comprise from about 0.2 percent to about 10 percent and preferably 0.5 to 5 percent by weight, measured as the free metal. As hereinbefore set forth, this contributes to reducing the acidity and assists in tempering the high activity of the catalyst to react with the nitro group.

The hydrogenation is effected at a temperature of at least 50° C. The temperature may be within the range of from 50° C. to about 150° C. and preferably from about 60° C. to about 125° C. The specific temperature will be correlated with the amount of catalyst and with the concentration of nitrobenzene in the alcohol solution. In general, lower temperatures are used with higher amounts of catalyst and with higher concentrations of nitrobenzene in the solution. The temperature will be sufficient to effect substantially complete conversion of the nitrobenzene and, as a feature of the present invention, cyclohexylamine will comprise at least 90 percent by weight of the reaction product. The hydrogenation is effected in a hydrogen pressure of at least 100 psi and may range as high as 3,000 psi or more but preferably is within the range of from about 300 to about 1,500 psi.

As hereinbefore set forth the catalyst is used in an amount of at least 0.001 percent by weight, computed as the metal, based on the nitrobenzene charge. In a batch type operation the amount of catalyst generally will be within the range of from about 0.001 percent to about 10 percent and preferably from about 0.01 to about 5 percent by weight, computed as the metal, based on the nitrobenzene charge. It has been found that an amount of catalyst below about 0.001 percent resulted in the reaction product containing aniline, regardless of how long a time the reaction was continued. For economical reasons, the amount of catalyst will be in as low an amount as sufficient for the purpose. Here again, the amount of catalyst will be correlated with the temperature and nitrobenzene-alcohol solvent.

The hydrogenation is effected in any suitable manner. In one method, the solution of nitrobenzene and catalyst are charged to an autoclave or other suitable reaction zone, which then is pressured to the desired hydrogen pressure. The autoclave may be of the rotating type, rocking type or any other suitable design to accomplish the desired mixing. In another embodiment the reaction zone may be equipped with a suitable mixing device. The reaction zone is heated to the desired temperature and maintained at the temperature for a sufficient time to effect substantially complete conversion of the nitrobenzene. In a continuous type process, the reaction zone is packed with a bed of the catalyst, and the nitrobenzene-alcohol solution and hydrogen are charged thereto in either upward or downward flow. The reaction zone may be heated externally or in any other suitable manner. In another embodiment, one or both of the hydrogen and nitrobenzene-alcohol solution are heated prior to entering the reaction zone.

Following completion of the reaction the effluent products are worked up in any suitable manner. Excess hydrogen is vented and the effluent products are filtered to remove catalyst in the case of batch type operation. In a continuous type operation, the hydrogen may be recycled for further use within the process. The remaining reaction products than are fractionated to separate the cyclohexylamine. As hereinbefore set forth, the cyclohexylamine will comprise at least 90 percent of the reaction product.

The following examples are introduced to illustrate further the novelty and utility of the present invention but not with the intention of unduly limiting the same.

EXAMPLE I

A number of runs was made in a magnetically stirred autoclave equipped with a dip-leg, heating and cooling coils, thermocouple and hydrogen inlet.

The autoclave was charged with 3 ml of nitrobenzene, 75 ml of tertiary butyl alcohol and 0.3 g. of 5 percent rhodium-alumina catalyst. The reaction was effected at an initial hydrogen pressure of 1,000 psig at 60° C. for 4.5 hours. The reaction products were analyzed by G.L.C. and found to comprise 99 percent cyclohexylamine and 1 percent dicyclohexylamine. The G.L.C. analysis was on the basis of the area percent of G.L.C.-volatile product on a solvent free basis. There was no unconverted nitrobenzene or aniline present in the reaction products.

EXAMPLE II

Another run was made in substantially the same manner as described in Example I except that the solvent was isopropyl alcohol. This run continued for 4 hours, and analysis by G.L.C. showed 96 percent cyclohexylamine and 4 percent dicyclohexylamine, with no unconverted nitrobenzene or aniline present in the reaction products.

EXAMPLE III

As hereinbefore set forth, it is essential that the alcohol solvent is a secondary or tertiary alcohol. This example reports a run which was made in the same manner as described in Examples I and II except that the solvent was ethyl alcohol. Analysis showed that 10 percent of aniline was present in the reaction product, thus showing that the nitrobenzene was not completely reacted to the desired cyclohexylamine. In complete conversion of nitrobenzene to cyclohexylamine is objectionable because of the loss of nitrobenzene in the production of aniline and the requirement of additional processing to separate the aniline from the cyclohexylamine.

EXAMPLE IV

Another run was made in a modified Fischer-Porter apparatus utilizing a temperature of 60° C. In this run, 1 ml of nitrobenzene in 25 ml of tertiary butyl alcohol solvent and 0.5 g. of 5 percent rhodium on carbon catalyst were charged. The reaction was effected at 60° C. and initial hydrogen pressure of 300 psi for 5.8 hours. The reaction products analyzed 90 percent cyclohexylamine and 10 percent dicyclohexylamine.

EXAMPLE V

Another run was made in the same manner as described in Example IV except that the solvent was ethyl acetate. After 3.4 hours, the reaction product comprised 100 percent aniline and no cyclohexylamine.

EXAMPLE VI

In another run using 0.1 g. rhodium-carbon catalyst and methanol solvent, the reaction product analyzed 20 percent aniline, 40 percent cyclohexylamine and 40 percent dicyclohexylamine. As hereinbefore set forth the formation of dicyclohexylamine is believed to be due, at least in part, to the more acidic methanol solvent.

We claim as our invention:

1. A process for hydrogenating nitrobenzene to cyclohexylamine in contact with a rhodium catalyst and minimizing the formation of dicyclohexylamine, which comprises effecting said hydrogenation in a secondary or tertiary monohydric unsubstituted alcohol of from three to about 20 carbon atoms at a temperature of at least 50° C., a hydrogen pressure of at least 100 psi and in contact with at least 0.001 percent by weight of catalyst, computed as metal, based on the nitrobenzene charge.

2. The process of claim 1 wherein said alcohol is isopropyl alcohol.

3. The process of claim 1 wherein said alcohol is tertiary butyl alcohol.

4. The process of claim 1 wherein the nitrobenzene is in a concentration of less than 50 percent by volume of said solution.

5. The process of claim 4 wherein said nitrobenzene is in a concentration of from about 2 to about 25 percent by volume of said solution.

6. The process of claim 1 wherein said catalyst comprises from about 0.1 to about 20 percent by weight of rhodium composited with alumina.

7. The process of claim 1 wherein said catalyst also contains an alkaline component.

8. The process of claim 1 wherein said catalyst is in an amount of from about 0.001 to about 10 percent by weight, computed as the metal, based on the nitrobenzene charge.

9. The process of claim 9 wherein said catalyst is in an amount of from about 0.01 to about 5 percent by weight, computed as the metal, based on the nitrobenzene charge.

10. The process of claim 1 wherein said alcohol contains from three to six carbon atoms.

* * * * *